June 19, 1956 C. E. LOMAX 2,751,434

AUTOMATIC TELEPHONE SYSTEMS PROVIDED WITH PARTY LINES

Filed Nov. 18, 1953 3 Sheets-Sheet 1

INVENTOR.
Clarence E. Lomax
BY
Smith, Olsen, Baird & Gulbrandsen Attys.

June 19, 1956 C. E. LOMAX 2,751,434

AUTOMATIC TELEPHONE SYSTEMS PROVIDED WITH PARTY LINES

Filed Nov. 18, 1953 3 Sheets-Sheet 2

INVENTOR.
Clarence E. Lomax

BY

Smith, Olsen, Baird & Gulbrandsen Attys.

June 19, 1956 C. E. LOMAX 2,751,434

AUTOMATIC TELEPHONE SYSTEMS PROVIDED WITH PARTY LINES

Filed Nov. 18, 1953 3 Sheets-Sheet 3

INVENTOR.
Clarence E. Lomax
BY
Smith, Olsen, Baird & Gulbrandsen Attys.

United States Patent Office 2,751,434

Patented June 19, 1956

2,751,434

AUTOMATIC TELEPHONE SYSTEMS PROVIDED WITH PARTY LINES

Clarence E. Lomax, Chicago, Ill., assignor to Automatic Electric Laboratories, Inc., Chicago, Ill., a corporation of Delaware Application November 18, 1953, Serial No. 392,892

9 Claims. (Cl. 179—17)

Figure 1:
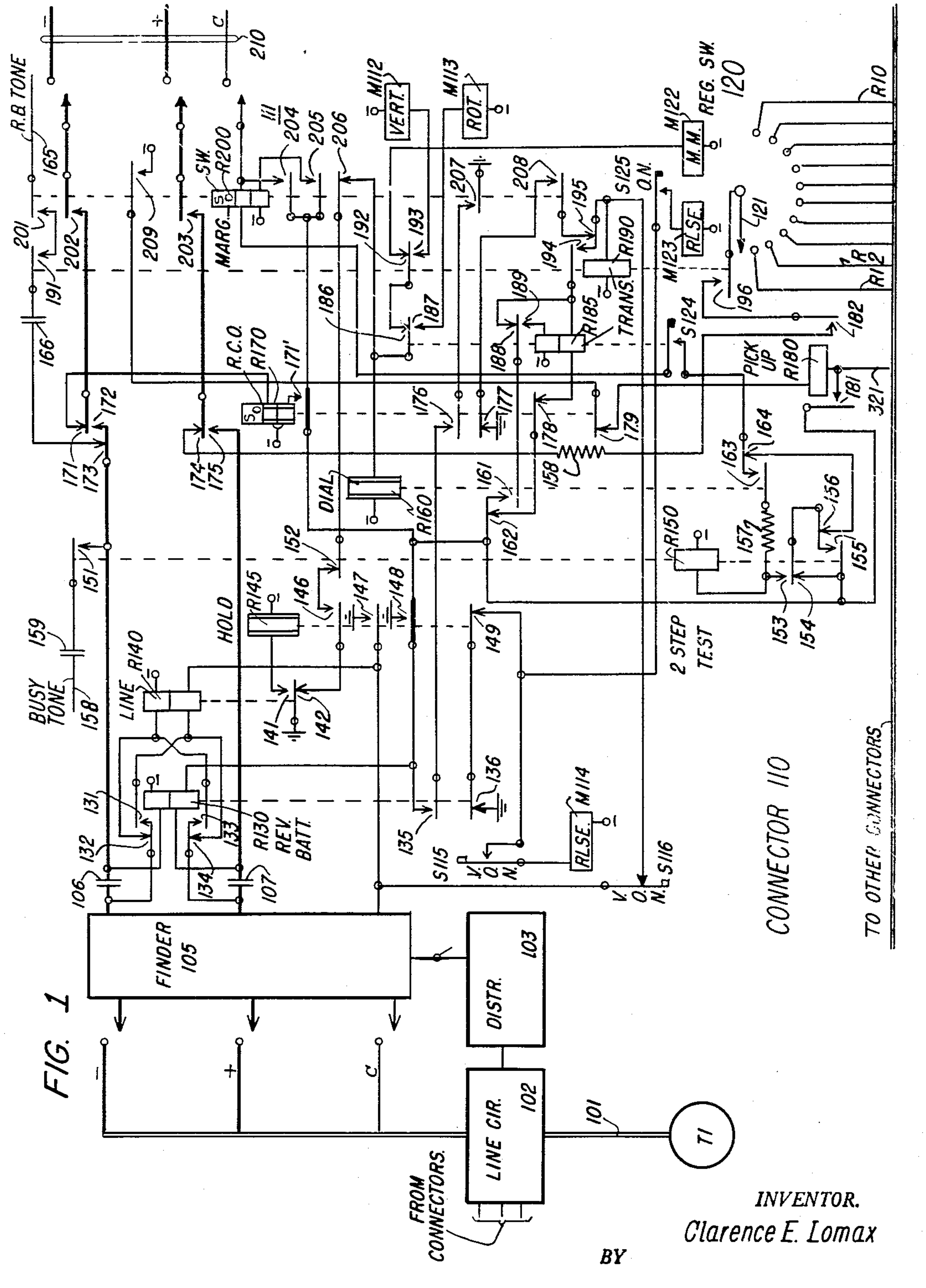

The present invention relates to automatic telephone systems provided with party lines, and more particularly to improvements in such systems as disclosed in U. S. Patent 1,727,137, granted on September 3, 1929, to Rudolph F. Stehlik.

In the telephone system disclosed in the Stehlik patent some of the party lines have fewer connected stations than the maximum number they are adapted to serve, and apparatus is provided for the purpose of intercepting calls directed via associated connector switches having access to these party lines and intended for unconnected or disconnected stations. In accordance with the arrangement each connector switch having access to the party lines comprises, in addition to the pair of line wipers and the usual control or C wiper, an extra control or EC wiper, and the associated contact bank comprises four corresponding sections; which extra control wiper and associated contact bank section is employed in the testing arrangement for determining whether the particular called station on a called party line is operatively connected to the line conductors thereof.

While the telephone system disclosed in the Stehlik patent is entirely satisfactory in operation, it is somewhat more expensive to manufacture than is desirable due primarily to the fact that each connector switch having access to the party lines must comprise the additional structure noted above.

Accordingly, it is a general object of the present invention to provide an improved telephone system of the type noted, which is more economical to manufacture, and which comprises connector switches having access to the party lines, wherein each connector switch incorporates only the pair of line wipers and the usual control wiper.

Another object of the invention is to provide in a telephone system of the type noted, an improved arrangement, wherein the special test to determine whether the particular called station on the called party line is operatively connected to the line conductors thereof is performed in response to the projection over the line wipers of the connector switch of the ringing signal individual to the particular called station noted.

A further object of the invention is to provide in a telephone system of the type noted, an improved arrangement, whereby a no-service tone is returned from the line circuit associated with a called party line over a calling connector switch when the particular called station on the called party line is not operatively connected to the line conductors thereof, thereby eliminating the necessity of an interceptor operator position.

A still further object of the invention is to provide in a telephone system of the type noted, an improved adapter circuit disposed between two normally disconnected sections of a party line, where one or more of the stations are absent from the party line, which adapter circuit is selectively controlled to complete a connection between the two sections of the party line depending upon whether the particular called station is present or absent with respect to the party line.

Further features of the invention pertain to the particular arrangement of the circuit elements of the telephone system, whereby the above outlined and additional operating features thereof are attained.

Figure 2:
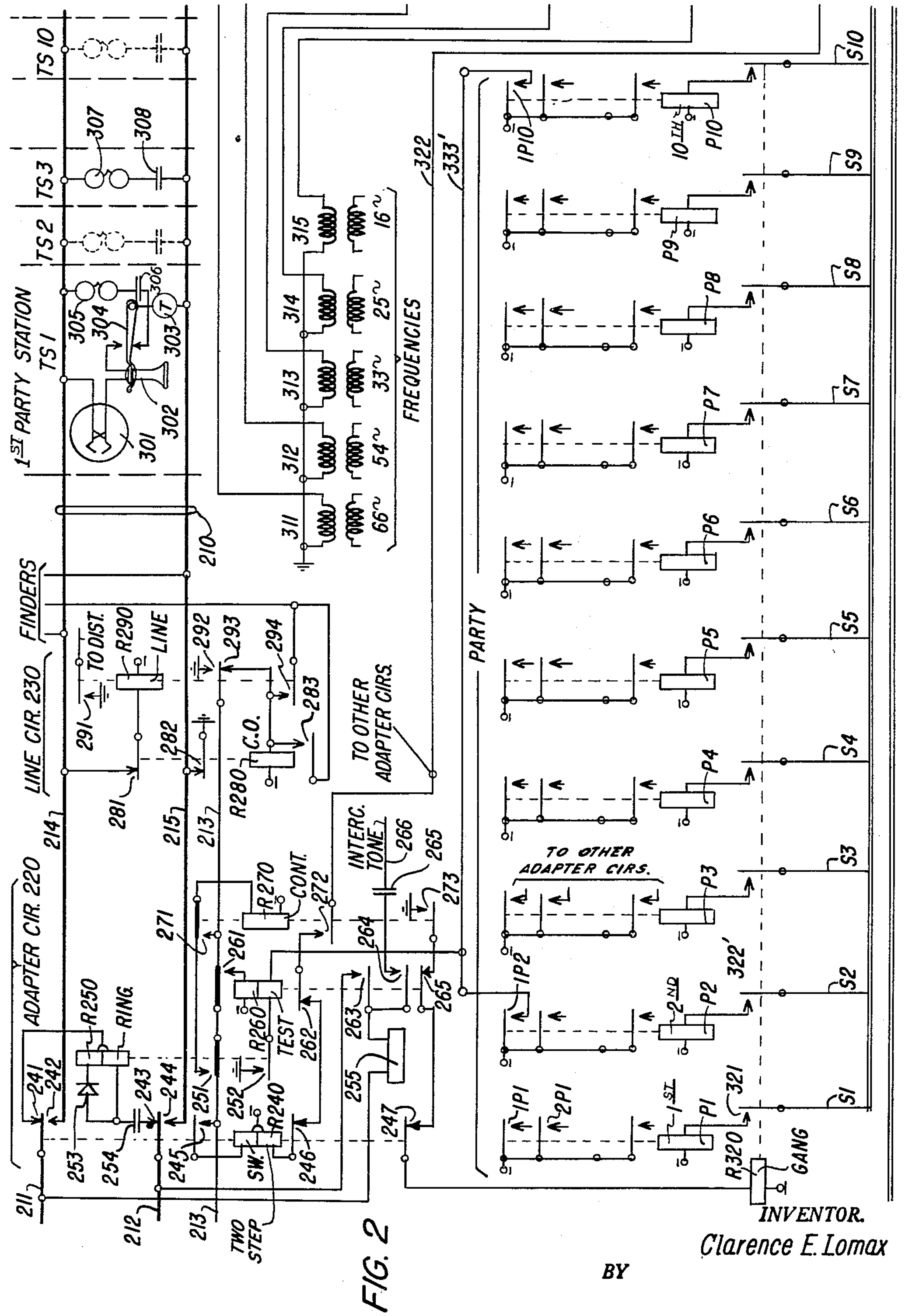
Figure 3:
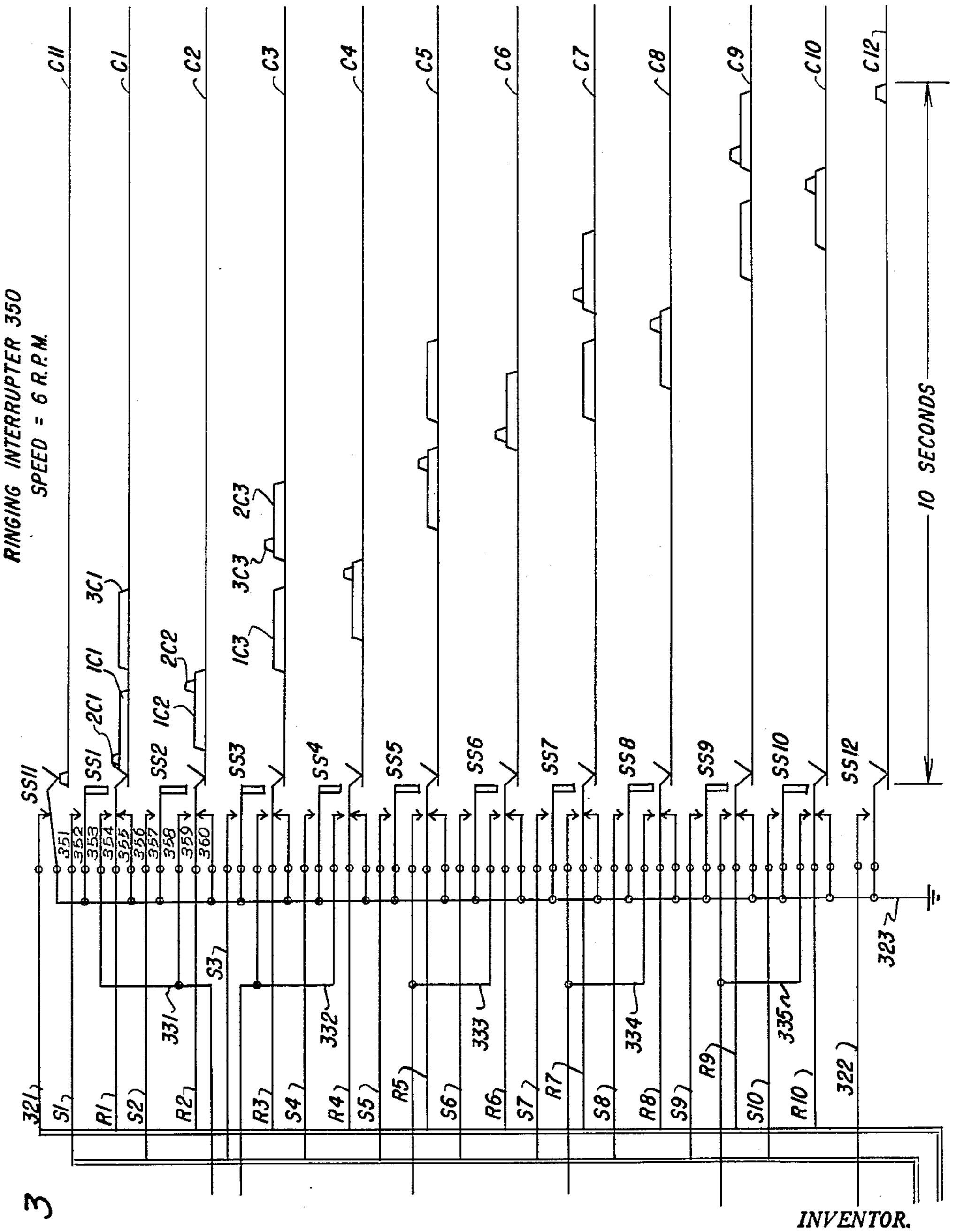

The invention, both as to its organization and method of operation, together with further objects and advantages thereof, will best be understood by reference to the following specification taken in connection with the accompanying drawings, in which Figs. 1 to 3, inclusive, taken together, illustrate the details of an automatic telephone system provided with party lines and incorporating therein the features of the present invention. In the drawings, Figs. 1 to 3, inclusive, should be arranged respectively from left to right in end-to-end relation in order to form a unified diagram.

Referring now more particularly to the drawings, there is illustrated an automatic telephone system comprising an exchange serving a number of private subscriber lines, including the private subscriber line 101 extending to the private subscriber substation T1, and a group of ten-party subscriber lines, including the ten-party subscriber line 210. As indicated, each of the ten-party subscriber lines 210, etc., is adapted to serve a maximum of ten individual stations, although fewer stations may be actually operatively connected thereto. For purpose of illustration, it may be assumed that the first, third, fourth, fifth, sixth, seventh, eighth and ninth stations are operatively connected to the line conductors of the party line 210, and that the second and tenth stations are unconnected or disconnected with respect to the line conductors thereof. In any case, the second and tenth stations are not operatively connected to the line conductors of the party line 210, and calls may not be extended thereto, as explained more fully hereinafter. In fact, the second and tenth stations mentioned may be unequipped for service thereto, or may have been discontinued.

The ten stations on the party line 210 are respectively indicated as TS1 to TS10, inclusive; and each equipped station comprises conventional station apparatus. For example, the equipped first station TS1 comprises a transmitter 303, a receiver 302, a calling device or dial 301, a switchhook 304, and a ringer 305 operatively connected via an associated condenser 306 and the hook switch circuit across the line conductors of the party line 210. The apparatus provided at the equipped third station TS3 is not illustrated, although the ringer and the associated condenser are respectively indicated at 307 and 308. In the telephone system a 1–2 ring, five ringing frequencies, bridged ringing arrangement is provided, whereby the first, third, fifth, seventh and ninth equipped stations on a party line are rung twice in each ringing cycle with the respective frequencies 66 cycles, 54 cycles, 33 cycles, 25 cycles and 16 cycles; and the second, fourth, sixth, eighth and tenth equipped stations on a party line are rung once in each ringing cycle with the respective frequencies 66 cycles, 54 cycles, 33 cycles, 25 cycles and 16 cycles. At each equipped station on a party line the ringer and associated condenser are bridged via the associated hook switch between the line conductors thereof.

Also each private subscriber substation is provided with conventional station apparatus, not shown.

Each of the private and party subscriber lines is provided with a line circuit individual thereto, the line circuit individual to the private line 101 being indicated at 102, and the line circuit individual to the party line 210 being indicated at 230. The line circuits 102 and 230 may be identical; the line circuit 230 comprising a cut off relay R280 and a line relay R290.

Also each party line is provided with an adapter circuit, preceding the line circuit thereof, in the event any one or more of the stations on the party line are unequipped. Accordingly, the party line 210 is provided with the adapter circuit 220, preceding the line circuit 230, since it has been assumed that on the party line 210 the second and tenth stations TS2 and TS10 are unequipped. As illustrated, the adapter circuit 220 comprises a switch relay R240, a ring relay R250, a test relay R260, a control relay R270 and an impedance 255.

Also the system comprises a distributor 103 of any conventional type, operatively associated with the line circuits 102, 230, etc., as well as a plurality of finder-connector links. One of the links is illustrated and comprises a finder 105 of any suitable type, although preferably of the Strowger type, and a connector 110 of the Strowger type. As illustrated, the connector 110 comprises a Strowger mechanism 111 including a wiper set, a vertical magnet M112 for driving the wiper carriage step by step in the vertical direction away from its normal vertical position, a rotary magnet M113 for driving the wiper carriage step by step in the rotary direction away from its normal rotary position, and a release magnet M114 for releasing the wiper carriage and for causing it to be returned into its normal rotary and vertical positions. Also, associated with the wiper carriage of the Strowger mechanism 111 are two sets of switch springs S115 and S116 that are operated when the wiper carriage is driven in the vertical direction away from its normal vertical position.

Further, the connector 110 comprises a register switch 120 of the minor type including a wiper 121 provided with an associated contact bank, a rotary magnet M122 for driving the wiper 121 step by step in the counterclockwise direction away from its normal rotary position, and a release magnet M123 for releasing the wiper 121 and for causing it to be returned into its normal rotary position. Also, two sets of switch springs S124 and S125 are operatively associated with the wiper 121 of the register switch 120 and are operated when the wiper 121 is rotated one step in the counterclockwise direction away from its normal rotary position.

Further, the connector 110 comprises a relay group, including a reverse battery relay R130, a line relay R140, a hold relay R145, a test relay R150, a dial relay R160, a ring cut off relay R170, a pickup relay R180, two transfer relays R185 and R190, and a switch relay R200.

Also, the exchange comprises common equipment, including a ringing interrupter 350, a group of ten party relays P1 to P10, inclusive, and a gang relay R320, as well as five ringing transformers 311, 312, 313, 314 and 315, respectively supplied with the ringing frequencies 66 cycles, 54 cycles, 33 cycles, 25 cycles and 16 cycles, previously noted. More particularly, the ringing interrupter 350 comprises a drum that is continuously rotated at a constant speed of 6 R. P. M. and that includes ten ringing cams C1 to C10, inclusive, a pickup cam C11 and a cut-through cam C12. Associated with the twelve cams C1 to C12, inclusive, are twelve switches SS1 to SS12, inclusive, respectively. In the arrangement, the ten switches SS1 to SS10, inclusive, respectively control the party relays P1 to P10, inclusive, and respectively govern the application of the five ringing frequencies, previously noted, to ten ringing conductors R1 to R10, inclusive, commonly extending to the various connectors 110, etc. In the ringing interrupter 350, the cams C1, C3, C5, C7 and C9 each comprises two elongated projections for the purpose of bringing about two ringing operations of the respectively associated switches SS1, SS3, SS5, SS7, and SS9, in each ringing cycle, as explained more fully hereinafter; and the cams C2, C4, C6, C8 and C10 each comprises a single elongated projection for the purpose of bringing about one ringing operation of the respectively associated switches SS2, SS4, SS6, SS8 and SS10, in each ringing cycle, as explained more fully hereinafter. The various projections carried by the cams C1, etc. are staggered in time-relation so as to bring about a certain sequence of operation of the switches SS1, etc., as explained more fully hereinafter. Also each of the cams C1, etc. carries a short high projection for the purpose of governing the associated switch SS1, etc., so as to effect operation of the party relays P1, etc. By way of illustration, it is noted that the cam C1 comprises the two spaced-apart elongated projections 1C1 and 3C1, as well as the short high projection 2C1 that are employed for the purposes previously mentioned.

The finders 105, etc. and the connectors 110, etc. have access to the various lines 101, 210, etc.; and the distributor 103 is common to the various finders 105, etc.

Considering now the general operation of the continuously operating interrupter 350, it is noted that in each ringing cycle thereof the pickup cam C11 closes and then opens the associated switch SS11; the ringing cams C1 to C10, inclusive, then selectively control the respective switches SS1 to SS10, inclusive; and then the cut-through cam C12 closes and then opens the set of switch springs S12. The ringing cam C1 controls the switch SS1, as previously noted; and specifically, when the front end of the elongated projection 1C1 rides under the associated control spring 354 the contacts between the springs 354 and 355 are opened to disconnect the grounded conductor 323 from the ringing conductor R1, and the contacts between the springs 354 and 353 are closed to connect the ringing conductor R1 to the conductor 331 extending to the secondary of the first ringing transformer 311. Thereafter, the short high projection 2C1 rides under the control spring 354, whereby the contacts between the springs 354 and 353 are retained closed and the contacts between the springs 352 and 351 are closed to connect the grounded conductor 323 to the conductor S1 extending to the first party relay P1. Subsequently, the short high projection 2C1 rides out from under the control springs 354, whereby the contacts between the springs 354 and 353 are maintained closed and the contacts between the springs 352 and 351 are opened. Still subsequently, the elongated projection 1C1 rides out from under the control spring 354, whereby the contacts between the springs 354 and 355 are reclosed and the contacts between the springs 354 and 353 are reopened. Still subsequently, the elongated projection 3C1 rides under the control spring 354 reopening the contacts between the springs 354 and 355 and reclosing the contacts between the springs 354 and 353. Ultimately, the elongated projection 3C1 rides out from under the control spring 354 so that the contacts between the springs 354 and 353 are reopened and the contacts between the springs 354 and 355 are reclosed. The operations of the cams C2, etc. to govern the switches SS2, etc. are similar to that of the cam C1 described above. Ultimately, it is noted that each of the elongated projections 1C1, 3C1, etc., corresponds to a time interval of 1.0 second; whereas each of the short high projections 2C1, etc., corresponds to a time interval of about 0.1 second.

In the telephone system each private subscriber substation T1, etc., and each party subscriber substation TS1, etc., is assigned a three-digit directory number individual thereto, the first and second digits being indicative of the contact set in the connector 110, etc., terminating the associated subscriber line, and the third digit being indicative of the desired ringing setting of the register switch in the associated connector. In connection with private subscriber lines 101, etc., the third digit is not material and may comprise the constant digit 2; whereas in connection with party subscriber lines 210, etc., the third digit is material as it establishes the ringing setting of the register switch in the associated connector, and consequently the selective signalling of the called party subscriber line, as previously noted.

Turning now to the connection and arrangement of the party relays P1 to P10, inclusive, in the common equipment, it is noted that connections are made therebetween to the test relay in the adapter circuit of each party subscriber line corresponding to the stations on the party subscriber line that are unequipped. For example, it has been previously assumed that the second and tenth stations on the party subscriber line 210 are unequipped, whereby a contact of the second party relay P2 and a contact of the tenth party relay P10 are commonly connected or strapped to a conductor 333' extending to the lower winding of the test relay R260 in the adapter circuit 220 individual to the party subscriber line 210, for a purpose more fully explained hereinafter.

The mode of operation of the apparatus incorporated in the telephone system will be better understood from the following description of calls involving the various subscriber substations.

First assuming that a call is initiated at the private subscriber substation T1, the associated line circuit 102 is controlled in order to cause the distributor 103 to assign an idle link, such, for example, as that illustrated, and then to control operation of the finder 105 of the assigned link to find the subscriber line 101 extending to the calling private subscriber substation T1. When the finder 105 finds the subscriber line 101, the line circuit 102 is controlled in order to mark the subscriber line 101 as busy to the connectors 110, etc., having access thereto, and to dismiss the distributor 103. At this time, a loop circuit is completed for energizing in series the upper and lower windings of the line relay R140; ground potential in the finder 105 being connected via the control conductor of the subscriber line 101, the lower winding of the line relay R140 and the contacts 134 to the positive line conductor of the subscriber line 101, and battery potential being connected via the upper winding of the line relay R140 and the contacts 132 to the negative line conductor of the subscriber line 101, and a bridge circuit at the calling private subscriber substation T1 being completed between the line conductors of the subscriber line 101. When the line relay R140 is thus energized it operates, to complete, at the contacts 141, a circuit for operating the hold relay R145. Upon operating the hold relay R145 completes, at the contacts 147, a multiple path for applying ground potential to the control conductor of the subscriber line 101 in order to retain the finder 105 in its operated position and to retain the line circuit 102 in its operated position. Also the application of ground potential to the control conductor of the subscriber line 101 completes a circuit including the set of switch springs S116 for operating the transfer relay R190. Upon operating the transfer relay R190 prepares, at the contacts 193, a point in a circuit traced hereinafter, for operating the vertical magnet M112 of the Strowger mechanism 111. Thus at this time, the call initiated at the calling private subscriber substation T1 has been extended via the subscriber line 101 and the finder 105 to the connector 110, and the connector 110 is conditioned to respond to the three digits comprising the directory number of the called station.

Now assuming that this call is to be extended to the first party station TS1 on the party subscriber line 210, the subscriber at the calling subscriber substation T1 dials the three-digit directory number of the called first party station TS1, which might be 241. The line relay R140 follows the impulses of the first digit 2; and each time the line relay R140 restores and then reoperates it interrupts and then recompletes, at the contacts 141, the circuit for energizing the winding of the hold relay R145; whereby the latter relay is retained in its operated position during dialing as it is of the slow-to-release type. Also each time the line relay R140 restores and then reoperates it completes and then interrupts, at the contacts 142, a circuit, including the contacts 146, 152 and 206, for energizing the winding of the dial relay R160; and a multiple circuit, also including the contacts 186 and 193, for operating the vertical magnet M112. Accordingly, the dial relay R160 operates and remains operated during dialing as it is of the slow-to-release type; and the vertical magnet M112 is operated and restored twice in succession driving the wiper carriage of the Strowger mechanism 111 two steps in the vertical direction away from its normal vertical position. Upon operating the dial relay R160 completes, at the contacts 161, a holding circuit, including the contacts 148, 188 and 194, for retaining operated the transfer relay R190. When the wiper carriage of the Strowger mechanism 111 is operated one step in the vertical direction away from its normal vertical position the sets of switch springs S115 and S116 are operated. More particularly, the set of switch springs S115 is operated in order to prepare a circuit traced hereinafter for operating the release magnet M114; and the set of switch springs S116 is operated in order to interrupt the original circuit for operating the transfer relay R190.

At the conclusion of the first digit 2, the line relay R140 is retained in its operated position retaining operated the hold relay R145 and causing the dial relay R160 to restore shortly thereafter, the latter relay being of the slow-to-release type. Upon restoring the dial relay R160 first completes, at the contacts 162, a path, including the contacts 178, 188 and 161, for short-circuiting the lower winding of the transfer relay R185; and then interrupts, at the contacts 161, the above-traced path and the multiple holding circuit for energizing the winding of the transfer relay R190; whereby there is completed a series circuit for energizing the lower winding of the transfer relay R185 and the winding of the transfer relay R190. This series circuit extends from ground by way of the contacts 148, 162 and 178, the lower winding of the transfer relay R185, the contacts 194, and the winding of the transfer relay R190 to battery; whereby the transfer relay R185 is operated and the transfer relay R190 is retained in its operated position. Upon operating, the transfer relay R185 interrupts, at the contacts 186, a further point in the circuit for operating the vertical magnet M112; and prepares, at the contacts 187, a point in a circuit traced hereinafter, for operating the rotary magnet M113.

The subscriber at the calling subscriber substation T1 then proceeds to dial the second digit 4; whereby the line relay R140 again follows retaining operated the hold relay R145. Each time the line relay R140 restores and then reoperates, it completes and then interrupts, at the contacts 142, the previously traced circuit for operating the dial relay R160, and the previously mentioned multiple circuit, including the contacts 187, for operating the rotary magnet M113. Accordingly, the dial relay R160 operates and remains operated during dialing and the rotary magnet M113 is operated and restored four times driving the wiper carriage of the Strowger mechanism 111 four steps in the rotary direction away from its normal rotary position. Upon operating the dial relay R160 completes, at the contacts 161, a holding circuit, including the contacts 189, for energizing the upper winding of the transfer relay R185; and interrupts, at the contacts 162, the previously traced holding circuit for energizing in series the lower winding of the transfer relay R185 and the winding of the transfer relay R190. Accordingly, at this time, the transfer relay R185 is retained in its operated position and the transfer relay R190 is restored. At the conclusion of the second digit 4, the line relay R140 is retained in its operated position retaining operated the hold relay R145 and causing the dial relay R160 to restore shortly thereafter, it being of the slow-to-release type. Upon restoring the dial relay R160 interrupts, at the contacts 161, the holding circuit for energizing the upper winding of the transfer relay R185. Accordingly, the transfer relay R185 restores interrupting, at the contacts 187, a further point in the circuit for operating the rotary magnet M113; and preparing, at the contacts 186, a point in a circuit, traced hereinafter, for operating the rotary magnet M122 of the register switch 120.

The subscriber at the calling subscriber substation T1 then proceeds to dial the third digit 1, whereby the line relay R140 again follows retaining operated the hold relay R145. Also when the line relay R140 restores and then reoperates it completes and then interrupts, at the contacts 142, the previously traced circuit for operating the dial relay R160 and the multiple circuit, including the contacts 186 and 192, for operating the rotary magnet M122. Accordingly the dial relay R160 operates and remains operated during dialing and the rotary magnet M122 is operated and restored once driving the wiper 121 of the register switch 120 one step in the counter-clockwise direction away from its normal rotary position. When the wiper 121 is thus driven one step in the counter-clockwise direction away from its normal rotary position, the sets of switch springs S124 and S125 are operated. More particularly, the set of switch springs S124 is operated to prepare a test circuit to the test relay R150, as explained more fully hereinafter; and the set of switch springs S125 is operated to prepare a circuit traced hereinafter for operating the release magnet M123 of the register switch 120. At the conclusion of the third digit 1, the line relay R140 is retained in its operated position retaining operated the hold relay R145 and causing the dial relay R160 to restore shortly thereafter. Thus at the conclusion of the second digit 4, the wiper carriage of the Strowger mechanism 111 was set in the vertical and rotary directions to engage the contact set terminating the party line 210; however, testing of the idle or busy condition of the selected called party line 210 by the test relay R150 was delayed by virtue of the open position of the set of switch springs S124. However, at the conclusion of the third digit 1, the wiper 121 has selected the first ringing conductor R1 and the set of switch springs S124 is closed; whereby the test relay R150 may proceed with the testing of the idle or busy condition of the called party line 210. Specifically, battery potential is applied by way of the winding of the test relay R150, the resistor 157, the contacts 163, the set of switch springs S124, the upper winding of the switch relay R200 and the control wiper of the wiper set to the control conductor 213 of the called party line 210.

First assuming that the called party line 210 is busy at this time, ground potential is applied to the control conductor 213 thereof, completing the above traced circuit for energizing the winding of the test relay R150 in series with the upper winding of the switch relay R200; whereby the test relay R150 operates through its first step, it being of the two-step type, but the switch relay R200 is not operated, as it is of the marginal type. When the test relay R150 operates through its first step, it prepares, at the contacts 153, a path traced hereinafter, for short-circuiting the associated series connected resistor 157. Shortly thereafter, when the dial relay R160 restores, it first completes, at the contacts 164, and then interrupts, at the contacts 163, the previously mentioned path for short-circuiting the resistor 157; which path, when completed, includes the contacts 153, 156, 164 and 163. When the resistor 157 is thus short-circuited a direct circuit is completed for energizing the winding of the test relay R150 in series with the upper winding of the switch relay R200; whereby the test relay R150 operates through its second step, although the switch relay R200 is not operated, as it is of the marginal type. When the test relay R150 operates through its second step, it completes, at the contacts 155, a holding circuit, including the contacts 153 and 148, for energizing the winding thereof; and interrupts, at the contacts 156, the above-traced series circuit for energizing the upper winding of the switch relay R200. Also the test relay R150 completes, at the contacts 151, a connection, including the associated condenser 159, between the busy-tone conductor 158 and the negative line of the finder 105, and consequently a connection to the negative line conductor of the subscriber line 101; whereby busy-tone is returned to the calling subscriber substation T1 indicating to the subscriber thereat that the desired connection may not be had at this time due to the busy condition of the called party line 210.

The subscriber at the calling subscriber substation T1 then disconnects interrupting the loop circuit for retaining operated the line relay R140 causing the latter relay to restore and effect the restoration of the hold relay R145 shortly thereafter, it being of the slow-to-release type. Upon restoring the hold relay R145 interrupts, at the contacts 147, the path for applying ground potential to the control conductor extending to the finder 105, whereby the finder 105 is released causing the line circuit 102 again to mark the subscriber line 101 as idle to the connectors 110, etc., having access thereto. Also upon restoring the hold relay R145 completes, at the contacts 149, multiple circuits, respectively including the sets of switch springs S115 and S125, for operating the release magnets M114 and M123. Upon operating the release magnet M114 releases the wiper carriage of the Strowger mechanism 111 causing it to be returned into its normal rotary and vertical positions; and upon operating the release magnet M123 releases the wiper 121 of the register switch 120 causing it to be returned in the clockwise direction back into its normal rotary position. Finally, the hold relay R145 interrupts, at the contacts 148, the holding circuit for retaining operated the test relay R150. When the wiper carriage of the Strowger mechanism 111 is thus released the sets of switch springs S115 and S116 are operated, the set of switch springs S116 being operated again to connect battery potential by way of winding of the transfer relay R190 to the control conductor of the finder 105, and the set of switch springs S115 being operated to interrupt the operating circuit for the release magnet M114. When the wiper 121 of the register switch 120 is thus released the sets of switch springs S124 and S125 are operated, the set of switch spring S124 being operated to interrupt the original circuit for the test relay R150, and the set of switch of springs S125 being operated to interrupt the operating circuit for the release magnet M123. At this time the connector 110 is completely released and available for further use.

Now assume that after the connector 110 has been operated in accordance with the third digit 1 dialed at the calling subscriber substation T1 and at the conclusion of the dialing of the directory number 241 of the called first party station TS1 on the called party line 210, the called party subscriber line 210 is idle. At this time, battery potential via the winding of the cut off relay R280 in the line circuit 230 is applied by way of the contacts 293 to the control conductor 213 of the called party line 210, completing a path substantially identical to that previously traced for short-circuiting in series the winding of the test relay R150, the upper winding of the switch relay R200 and the winding of the cut off relay R280. Accordingly, in this event the test relay R150 is not operated; and shortly thereafter when the dial relay R160 restores, it interrupts, at the contacts 163, the above-traced series path for short-circuiting the windings noted. Specifically, upon restoring the dial relay R160 interrupts, at the contacts 163, the connection of the winding of the test relay R150 to the upper winding of the switch relay R200; and completes, at the contacts 164, a direct path, including the contacts 148, 154, 156 and 164 and the set of switch springs S124, for applying ground potential to one terminal of the upper winding of the switch relay R200. Accordingly, at this time a direct circuit is completed for energizing the upper winding of the switch relay R200 in series with the winding of the cut off relay R280, whereby the switch relay R200 operates shortly thereafter, it being of the slow-to-operate type. Upon operating, the switch relay R200 completes, at the contacts 205, a holding circuit, including the contacts 148, for energizing the lower winding thereof; and completes, at the contacts 204, a direct path, including the contacts 148, for applying ground potential to the control wiper of the wiper set of the Strowger mechanism 111 and consequently to the control conductor 213 of the called party line 210 causing the cut off relay R280 to operate. This application of direct ground potential to the control conductor 213 of the called party line 210 marks the called party line 210 as busy to the other connectors having access thereto. Upon operating the cut off relay R280 interrupts, at the contacts 281 and 282, the normal connections for applying battery potential and ground potential to the respective negative and positive line conductors 214 and 215 of the party line 210, thereby disconnecting the line relay R290 from the negative line conductor 214 of the party line 210. Also, the cut off relay R280 completes, at the contacts 283, a direct path for applying ground potential to the control conductor extending to the finders having access to the party line 210.

Also upon operating the switch relay R200 completes, at the contacts 208, a circuit, including the contacts 195 and 177, for reoperating the transfer relay R190. Upon reoperating the transfer relay R190 completes, at the contacts 191, a connection, including the contacts 201 and 173 and the condenser 106, between the ring-back-tone conductor 165 and the negative line conductor of the finder 105; whereby ring-back tone current is returned over the negative line conductor of the subscriber line 101 to the calling subscriber substation T1 indicating to the subscriber thereat that the called first party station TS1 is being rung. Further, the switch relay R200 prepares, at the contacts 202 and 203, a ringing circuit the finder 105; whereby ring-back tone current is re-between the first ringing conductor R1 selected by the wiper 121 of the register switch 120 and the ring relay R250 in the adapter circuit 220, for a purpose more fully described below.

Subsequently the continuously operating ringing interrupter 350 brings about the closure of the switch SS11 by the cam C11 so that the grounded conductor 323 is connected to the pickup conductor 321, whereby a circuit is completed for operating the pickup relay R180 in the connector 110, this circuit further including the contacts 179 and 209. Upon operating, the pickup relay R180 completes, at the contacts 181, a holding circuit, including the contacts 148, 179 and 209, for energizing the winding thereof; and completes, at the contacts 182, the previously mentioned ringing connection between the first ringing conductor R1 and the ring relay R250 in the adapter circuit 220. This ringing connection extends from the first ringing conductor R1 via the wiper 121 of the register switch 120 and the engaged first contact in the associated contact bank, the contacts 196 and 182, the resistor 158, the contacts 174 and 203 and the positive wiper to the positive line conductor 212 of the called party line 210; and from battery potential via the upper winding of the ring cut off relay R170, the contacts 171 and 202 and the negative wiper to the negative line conductor 211 of the called party subscriber line 210. Also, at this time, the upper and lower windings of the ring relay R250 are bridged across the line conductors 211 and 212 of the called party line 210 via a connection, including the contacts 241 and 243 and the condenser 254; the copper oxide rectifier 253 being included in series with the upper winding of the ring relay R250.

Subsequently the ringing interrupter 350 opens the set of switch springs SS11 interrupting the application of ground potential to the pickup conductor 321; however, without effect at this time since a holding circuit is completed for retaining operated the pickup relay R180 in the connector 110. Still subsequently, the front end of the elongated projection 1C1 carried by the cam C1 rides under the control spring 354; whereby the first ringing conductor R1 is disconnected from the grounded conductor 323 and is connected to the conductor 331 so that ringing current of the frequency 66 cycles is connected from the first ringing transformer 311 to the first ringing conductor R1; whereby the upper and lower windings of the ring relay R250 are energized in parallel relation, and the upper winding of the ring cut off relay R170 is energized in series relation. When this circuit is thus completed, the rectifier 253 effects half-wave rectification so that the upper winding of the ring relay R250 is energized with pulsating components of direct current causing the latter relay to operate; however, the ring cut off relay R170 will not operate in this fundamentally alternating current circuit. Upon operating the ring relay R250 completes, at the contacts 251, a circuit for operating the control relay R270, this circuit including the grounded control conductor 213 of the called party line 210. Also upon operating, the ring relay R250 completes, at the contacts 252, a path for applying positive ground potential to one terminal of the lower winding of the test relay R260; which application of positive ground potential comprises a portion of a test circuit for the test relay R260 that will not be completed in the present example by virtue of the circumstance that the called first party station TS1 on the called party line 210 is equipped. Upon operating, the control relay R270 completes, at the contacts 271, a holding circuit for energizing the winding thereof; and completes, at the contacts 273, a circuit, including the contacts 265 and 247, for operating the gang relay R320. Upon operating the gang relay R320 completes, at the contacts 321, etc., connections between the windings of the party relays P1, etc., and the corresponding marking conductors S1, etc., thereby to prepare for operation the party relays P1, etc.

Still subsequently, the short high projection 2C1 rides under the control spring 354 in order to connect the grounded conductor 323 to the first marking conductor S1, whereby the first party relay P1 is operated. Upon operating, the first party relay P1 completes, at the contacts 1P1, etc., connections for applying negative battery potential to the various test relays in the various adapter circuits in which the first party stations are not equipped upon the corresponding party subscriber lines. In the present example, the operation of the first party relay P1 is of no effect since the contacts 1P1, etc., are not connected to the lower winding of the test relay R260 in the adapter circuit 220 individual to the called party line 210.

Still subsequently, the short high projection 2C1 rides out from under the control spring 354 thereby to interrupt the previously traced circuit for operating the first party relay P1, so that the first party relay P1 restores at this time. However the projection of the ringing current of 66 cycles from the first ringing transformer 311 over the first ringing conductor R1 is continued so as to retain the ring relay R250 in its operated position at this time.

Still subsequently, the elongated projection 1C1 rides out from under the control spring 354, whereby the first ringing conductor R1 is disconnected from the conductor 331 and is reconnected to the grounded conductor 323, whereby the projection of the ringing current of 66 cycles from the first ringing transformer 311 over the first ringing conductor R1 is terminated bringing about the restoration of the ring relay R250. Upon restoring, the ring relay R250 interrupts, at the contacts 252, the previously completed path for applying positive ground potential to one terminal of the lower winding of the test relay R260 so as to interrupt a further point in the test circuit for energizing the lower winding of the test relay R260.

Still subsequently, the short high projection 2C2 carried on the cam C2 effects operation of the switch SS2 so that the grounded conductor 323 is connected to the second marking conductor S2 to effect operation of the second party relay P2; however, at this time the switch SS2 is also operated to project the ringing current of the frequency of 66 cycles from the first ringing transformer 311 over the second ringing conductor R2 that is not engaged by the wiper 121 of the register switch 120; whereby the ring relay R250 does not occupy its operated position. Accordingly, this operation of the second party relay P2 to apply negative battery potential to the conductor 333′ and consequently to the other terminal of the lower winding of the test relay R260 is without effect since the ring relay R250 occupies its restored position. Thus in the present example, there is no matching between the operated position of the ring relay R250 and the operated position of the second party relay P2 so that the test relay R260 in the adapter circuit is not operated. In the subsequent operation of the ringing interrupter 350 the third party relays P3, etc., are sequentially operated; however without effect, in the present example, since there is no matching between the operated position of the ring relay R250 and one of the party relays P1, etc., that is strapped to the conductor 333'.

Still later the cam C12 operates the switch SS12 so as to connect the grounded conductor 323 to the conductor 322 completing a circuit, including the contacts 272, 262 and 246, for energizing the lower winding of the switch relay R240. When the lower winding of the switch relay R240 is thus energized it operates through its first step, it being of the two-step type, completing, at the contacts 245, a circuit for energizing the upper winding thereof via the grounded control conductor 213 of the party subscriber line 210. Ultimately the cam C12 opens the switch SS12 removing ground potential from the conductor 322, whereby the switch relay R240 is operated through its second step to interrupt, at the contacts 246, a further point in the circuit for energizing the lower winding thereof. Also the switch relay R240 interrupts, at the contacts 241 and 243, the connection between the line conductors 211 and 212 of the party line 210 and the ring relay R250; and completes, at the contacts 242 and 244, connections between the line conductors 211 and 212 and the corresponding sections 214 and 215 of the line conductors of the party line 210 that extend via the line circuit 230 to the party stations TS1, etc. Further the switch relay R240 interrupts, at the contacts 247, the circuit for retaining operated the gang relay R320 so that the party relays P1, etc., are disconnected from the marking conductors S1, etc.

Accordingly, during the first cycle of operation of the ringing interrupter 350, a test was made to determine whether or not the particular called first party station TS1 was equipped, and accordingly whether the present call should be intercepted. In the present example, it was determined that the called first party station TS1 was equipped and that the present call was not to be intercepted; whereby at the conclusion of the first cycle of operation of the ringing interrupter 350, the switch relay R240 was operated to disconnect the adapter circuit 220 so that the connection is extended directly from the connector 110 via the called party subscriber line 210 to the line sections 214 and 215 extending to the various party stations TS1, etc.

The ringing interrupter 350 then proceeds through a second cycle, whereby two splashes of ringing current of 66 cycles are transmitted over the first ringing conductor R1 as a consequence of the cooperation of the two elongated projections 1C1 and 3C1 carried by the cam C1 with the switch SS1, each of these splashes of ringing current being of one second duration, the two splashes of ringing current being separated by a time interval of 0.2 second. The circuit for projecting the ringing current extends from the first ringing conductor R1 via the wiper 121 of the register switch 120 and the engaged first contact in the associated contact bank, the contacts 196 and 182, the resistor 158, the contacts 174 and 203, the positive wiper, the positive line conductor 212, the contacts 244, the positive line section 215, the transmitter 303, the hookswitch 304, the condenser 306, the ringer 305, the negative line section 214, the contacts 242, the negative line conductor 211, the negative wiper, the contacts 202 and 171 and the upper winding of the ring cut off relay R170 to battery potential. Accordingly, the ringer 305 at the first party station TS1 is operated by the two splashes of ringing current thereby signalling the subscriber thereat; however, the ring cut off relay R170 is not operated by this alternating current. The operation of the ringer 305 at the first party station TS1, described above, continues in the third and following cycles of the ringing interrupter 350 and until the call is answered on the called party line 210 or until the call is abandoned at the calling subscriber substation T1. When the subscriber at the called first party station TS1 answers the call by removing the receiver 302 from the switchhook 304, the circuit for operating the ringer 305 is interrupted, and a bridge circuit is completed at the switchhook 304 via the transmitter 303, the receiver 302 and the dial 301 across the line sections 214 and 215 of the called party line 210; whereby a circuit is completed for energizing the upper winding of the ring cut off relay R170, causing the latter relay to operate shortly thereafter, it being of the combination slow-to-operate and slow-to-release type. This circuit extends from ground potential either during a ringing period or a silent period via the first ringing conductor R1 over the previously traced path to the positive line conductor 212, and from battery potential via the upper winding of the ring cut off relay R170 over the previously traced path to the line conductor 211. Upon operating, the ring cut off relay R170 completes, at the contacts 171', a holding circuit, including the contacts 148, for energizing the lower winding thereof; and interrupts, at the contacts 171 and 174, points in the circuit for projecting ringing current over the line conductors 211 and 212 of the called party line 210. Also the ring cut off relay R170 interrupts, at the contacts 173, the previously traced path for returning ring-back-tone current over the negative line conductor of the subscriber line 101; interrupts, at the contacts 177, the original circuit for operating the transfer relay R190; and interrupts, at the contacts 178, the holding circuit for energizing the lower winding of the transfer relay R185 in series with the winding of the transfer relay R190 in order to cause the latter relays to restore at this time. Further, the ring cut off relay R170 interrupts, at the contacts 179, the holding circuit for retaining operated the pick up relay R180; whereby the latter relay restores interrupting, at the contacts 182, a further point in the ringing circuit. Finally, the ring cut off relay R170 completes, at the contacts 172 and 175, a loop circuit for energizing in series the upper and lower windings of the reverse battery relay R130. This circuit extends from ground potential by way of the contacts 148, the lower winding of the reverse battery relay R130 and the contacts 175 and 203 to the positive wiper; and from battery potential by way of the upper winding of the reverse battery relay R130 and contacts 172 and 202 to the negative line wiper; the circuit finally includes the line conductors 211 and 212 of the party line 210, the contacts 242 and 244, the line sections 214 and 215, and the bridge connection at the called first party station T1. When this circuit is completed, the reverse battery relay R130 operates to complete, at the contacts 135, a multiple holding circuit, including the contacts 176 and 207, for energizing in series the upper and lower windings thereof; and interrupts, at the contacts 136, a further point in the multiple circuits for operating the release magnets M114 and M123. Finally, the reverse battery relay R130 reverses, at the contacts 131, 132, 133 and 134, the polarity of the connection between the upper and lower windings of the line relay R140 and the line conductors of the subscriber line 101 extending to the calling subscriber substation T1; which reversal of polarity over the line conductors of the subscriber line 101 may be employed in the line circuit 102 for metering or other purposes, in a conventional manner, not shown. Finally, the loop circuit extending from the calling subscriber substation T1 to the upper and lower windings of the line relay R140 is operatively connected by the condensers 106 and 107 to the loop circuit extending between the called first party station TS1 and the upper and lower windings of the reverse battery relay R130; whereby the subscriber at the calling subscriber substation T1 and the subscriber at the called first party station TS1 may converse with each other.

At the conclusion of the established connection when the subscriber at the calling subscriber substation T1 disconnects, the loop circuit extending to the line relay R140 is interrupted causing the latter relay to restore and effect restoration of the hold relay R145 shortly thereafter, the latter relay being of the slow-to-release type. When the subscriber at the called first party station TS1 disconnects, the loop circuit extending to the reverse battery relay R130 is interrupted causing the latter relay to restore. Upon restoring, the reverse battery relay R130 and the hold relay R145 respectively complete, at the contacts 136 and 149, the previously traced circuits for operating the release magnets M114 and M123; whereupon the Strowger mechanism 111 and the register switch 120 are released, in the manner previously explained. Also upon restoring, the reverse battery relay R130 interrupts, at the contacts 135, a multiple holding circuit, including the contacts 207 and 176, for retaining operated the ring cut off relay R170 and the switch relay R200, causing the relays mentioned to restore, the ring cut off relay R170 being slow-to-release, as it is of the combination slow-to-operate and slow-to-release type. When ground potential is thus removed from the control conductor of the finder 105, as a consequence of the restoration of the hold relay R145, the finder 105 is released and the line circuit 102 is controlled to mark the subscriber line 101 as idle to the connectors 110, etc., having access thereto.

At this time the connector 110 is completely released and the holding circuits for retaining operated the switch relay R240 and the control relay R270 in the adapter circuit 220 and the cut off relay R280 in the line circuit 230 are interrupted causing the relays mentioned to restore. Upon restoring, the switch relay R240 interrupts, at the contacts 242 and 244, the connections between the line conductors 211 and 212 of the party line 210 and the line sections 214 and 215; and recompletes, at the contacts 241 and 243 the normal connections bridging the ring relay R250 across the line conductors 211 and 212. Upon restoring, the cutoff relay R280 again connects, at the contacts 281 and 282, battery and ground potentials to the line sections 214 and 215 of the party line 210. Also, at this time, ground potential is removed from the control conductor 213 of the party line 210 and battery potential via the winding of the cut off relay R280 is returned thereto; whereby the party line 210 is again marked as idle to the connectors 110, etc., having access thereto. Accordingly, at this time, the established connection between the calling subscriber substation T1 and the called party station TS1 is released and all of the apparatus involved therein is completely released and available for further use.

Now assuming that the subscriber at the calling subscriber substation T1 initiates a call and attempts to direct the call to the second party station TS2, that is not operatively connected to the party line 210, the subscriber at the calling subscriber substation T1 after initiating the call dials the directory number 242 that would normally be assigned to the second party station TS2 on the called party line 210. Again the finder 105 and the connector 110 may be taken into use; and again the Strowger mechanism 111 in the connector 110 is operated to select the called subscriber line 210; all in the manner previously explained. In this case, the third digit 2 is registered in the register switch 120, and the test relay R150 again tests the idle or busy condition of the called subscriber line 210 following the registration of the third digit 2 in the register switch 120, all in the manner described above. Now assuming that the called subscriber line 210 is idle, the switch relay R200 is again operated. In this example, the wiper 121 of the register switch 120 engages the second contact in the associated contact bank terminating the second ringing conductor R2 extending to the ringing interrupter 350. Upon operating the switch relay R200 effects operation of the transfer relay R190, whereby the latter relay effects operation of the transfer relay R185.

Now in the beginning of a first cycle of the ringing interrupter 350 the application of ground potential upon the conductor 321 effects operation of the pickup relay R180; whereby the ringing interrupter 350 subsequently brings about the projection of the ringing current of the frequency of 66 cycles over the second ringing conductor R2; whereby the ring relay R250 in the adapter circuit 220 is operated; all in the manner previously explained. Upon operating, the ring relay R250 effects operation of the control relay R270; and completes, at the contacts 252, the previously mentioned path for applying positive ground potential to one terminal of the lower winding of the test relay R260. Now in the present example, the ringing current is projected over the second ringing conductor R2, as a consequence of the operation of the switch SS2, as the front end of the elongated projection 1C2 carried by the cam C2 rides under the control spring 359 closing the contacts between the springs 359 and 358. Subsequently, when the short high projection 2C2 carried by the cam C2 rides under the control spring 359, the switch SS2 is operated to engage the springs 357 and 356; whereby the second party relay P2 is operated. Upon operating, the second party relay P2 completes, at the contacts 1P2, a path for applying negative battery potential to the conductor 333' and thence to the other terminal of the lower winding of the test relay R260. Accordingly, in the present example, the simultaneous and matched operations of the ring relay R250 and the second party relay P2 bring about the simultaneous and matched applications of positive ground potential and negative battery potential to the respective terminals of the lower winding of the test relay R260; whereby the latter relay operates, completing, at the contacts 261, a holding circuit for energizing the upper winding thereof. Also the test relay R260 interrupts, at the contacts 262, a further point in the circuit for energizing the lower winding of the switch relay R240 so as positively to prevent operation of the latter relay under the control of the ringing interrupter 350, in the present example. Further, the test relay R260 completes, at the contacts 263, a path for bridging the impedance 255 across the line conductors 211 and 212 of the party line 210 so as to bring about operation of the ring cut off relay R170, in the manner previously explained. The ring cut off relay R170 completes, at the contacts 172 and 175, the loop circuit extending to the reverse battery relay R130 in order to cause the latter relay to operate. Further, the ring cut off relay R170 effects the restoration of the transfer relays R185 and R190 and the pick up relay R180; all in the manner previously described.

Accordingly, at this time, the connector 110 has switched-through to the wiper set of the Strowger mechanism 111, although the adapted circuit 220 has not switched-through by virtue of the failure of the operation of the switch relay R240 brought about by operation of the test relay R260. Finally, the test relay R260 completes, at the contacts 264, a path, including the condenser 265, for connecting the intercept-tone conductor 266 to the impedance elements 255 and to the contacts 263; whereby the intercept-tone current is returned over the line conductors 211 and 212 of the called party line 210 and consequently over the line conductors of the subscriber line 101 to the calling subscriber substation T1, indicating to the subscriber thereat that service is not rendered to the called second party station TS2 on the called party line 210.

Upon receiving the intercept or no-service tone the subscriber at the calling subscriber substation T1 disconnects effecting the release of the line relay R140 and the consequent release of the connector 110, in the manner previously explained. Also in this case incident to the release of the Strowger mechanism 111, the removal of ground potential from the control conductor 213 of the party subscriber line 210 brings about the restoration of the control relay R270 and the test relay R260 in the adapter circuit 220, as well as the restoration of the cut off relay R280 in the line circuit 230; whereby the party line 210 is again marked as idle to the connector 110, etc., having access thereto; all in the manner previously explained. Of course, the finder 105 is again released, and the line circuit 102 again marks the subscriber line 101 as idle to the connectors 110, etc., having access thereto. At this time, the connection from the calling subscriber substation T1 to the called party line 210 is released and all of the apparatus involved therein is completely released and available for further use.

In view of the foregoing description of the operation of the adapter circuit 220 in conjunction with the ringing interrupter 350, and in connection with the operation of the connector 110, it will be understood that when the Strowger mechanism 111 is operated to select the called party line 210 that the further operation of the adapter circuit 220 either to switch the connection forward or to bring about the return of the intercept or no-service tone is dependent upon the character of the third digit registered in the register switch 120 for identifying the particular called party station on the party line 210. In the present example, when either of the third digits 2 and 0 are registered in the register switch 120 the test relay R260 in the adapter circuit 220 is operated in the first cycle of operation of the ringing interrupter 350 bringing about the return of the intercept or no-service tone to the calling subscriber substation. On the other hand, in the present example when a third digit, other than the digits 2 and 0, are registered in the register switch 120, the test relay R260 in the adapter circuit 220 is not operated in the first cycle of the ringing interrupter 350; whereby the switch relay R240 in the adapter circuit 220 is operated at the conclusion of the first cycle of the ringing interrupter 350, so that the selected ringing current may be ultimately projected over the line sections 214 and 215 of the called party line 210 in the second or next following cycle of operation of the ringing interrupter 350. As previously pointed out, the matching between the operation of the ring relay R250 in the adapter circuit 220 and one of the party relays P2, etc. is effected by the particular strapping to the conductor 333' extending to the test relay R260 in the adapter circuit 220; which strapping is, of course, dependent upon the unequipped party stations upon the party line 210, as previously explained.

In conjunction with the operation of the ringing interrupter 350, it is again noted that on a fully equipped party subscriber line, the first and second party stations are rung with the first ringing frequency of 66 cycles; the second and third party stations are rung with the second ringing frequency of 54 cycles; etc. However, the projection of either two splashes or one splash of the first ringing frequency of 66 cycles over the called party subscriber line is indicative of whether the call is intended for the subscriber at the first party subscriber substation or at the second party subscriber substation thereon. In other words, the one and two frequency ring upon the called party line comprises a code indicative of the particular one of the two stations for which the call is intended. Of course, it will be understood that only the ringers at the first and second party stations on the party line respond to the first ringing frequency of 66 cycles, the arrangement of the ringers at the other pairs of party stations on the party subscriber line being identical with respect to the second, etc., ringing frequencies of 54 cycles, etc.

Further, it will be understood that in connection with a party subscriber line having ten equipped party stations thereon, no adapter circuit is necessary; and the line circuit thereof is terminated directly in the banks of the Strowger mechanisms of the various connectors 110, etc.

In view of the foregoing, it is apparent that there has been provided an improved telephone system including both private subscriber lines and party subscriber lines and switching links for setting up connections therebetween, wherein the connector incorporated in each switching link embodies an improved arrangement for returning an intercept or no-service tone to a calling subscriber substation when a directory number is registered therein that identifies a called party station on a called party line that is not operatively connected to the line conductors of the called party line, or at which the completion of calls is otherwise not desired.

While there has been described what is at present considered to be the preferred embodiment of the invention, it will be understood that various modifications may be made therein, and it is intended to cover in the appended claims all such modifications as fall within the true spirit and scope of the invention.

What is claimed is:

1. A telephone system comprising a party line adapted to serve a given maximum number of stations, a plurality of stations fewer in number than said given number operatively connected to said party line, a plurality of ringing conductors and a plurality of marking conductors each respectively corresponing to said given number of stations, a generator for applying in timed sequence in repeated cycles a corresponding plurality of ringing signals to said ringing conductors and a marking potential to said marking conductors, whereby a given ringing signal is applied to a corresponding given ringing conductor simultaneously with the application of said marking potential to a corresponding given marking conductor, a switch having access to said party line and to said ringing conductors, means for selectively operating said switch to select said party line and to select any one of said ringing conductors, means for completing a connection between said party line and said selected one ringing conductor so that the corresponding one ringing signal is projected over said party line, a line circuit associated with said party line and including a ring relay selectively controlled by said one ringing signal projected over said party line, means controlled jointly by said ring relay and by the simultaneous application of said marking potential to the particular one of said marking conductors corresponding to said one ringing signal for testing with respect to said party line the presence or absence of the particular one of said stations also corresponding to said one ringing signal, said switch including a cut off relay operative to interrupt said connection between said party line and said selected one ringing conductor, first means responsive to testing of the absence of said one station from said party line for operating said cut off relay, and second means responsive to answering on said party line for operating said cut off relay.

2. The telephone system set forth in claim 1, wherein said party line includes a pair of line conductors, said ringing signals are of alternating voltage, and said ring relay is provided with an operating winding, and further comprising an operating circuit for said ring relay including said operating winding and an unidirectional current conducting device and extending between said line conductors.

3. The telephone system set forth in claim 2, wherein said device consists essentially of a dry-plate rectifier.

4. A telephone system comprising a party line adapted to serve a given maximum number of stations, a plurality of stations fewer in number than said given number operatively connected to said party line, a plurality of ringing conductors and a plurality of marking conductors each respectively corresponding to said given number of stations, a generator for applying in timed sequence in repeated cycles a corresponding plurality of ringing signals to said ringing conductors and a marking potential to said marking conductors, whereby a given ringing signal is applied to a corresponding given ringing conductor simultaneously with the application of said marking potential to a corresponding given marking conductor, a switch having access to said party line and to said ringing conductors, means for selectively operating said switch to select said party line and to select any one of said ringing conductors, means for completing a connection between said party line and said selected one ringing conductor so that the corresponding one ringing signal is projected over said party line, a line circuit associated with said party line and including a ring relay selectively controlled by said one ringing signal projected over said party line, means controlled jointly by said ring relay and by the simultaneous application of said marking potential to the particular one of said marking conductors corresponding to said one ringing signal for testing with respect to said party line the presence or absence of the particular one of said stations also corresponding to said one ringing signal, said switch including a cut off relay operative to interrupt said connection between said party line and said selected one ringing conductor, means responsive to testing of the absence of said one station from said party line for operating said cut off relay and for returning a no-service tone over said switch, and additional means responsive to answering on said party line for operating said cut off relay.

5. A telephone system comprising a party line adapted to serve a given maximum number of stations, a plurality of stations fewer in number than said given number operatively connected to said party line, a plurality of ringing conductors and a plurality of marking conductors each respectively corresponding to said given number of stations, a generator for applying in timed sequence in repeated cycles a corresponding plurality of ringing signals to said ringing conductors and a marking potential to said marking conductors, whereby a given ringing signal is applied to a corresponding given ringing conductor simultaneously with the application of said marking potential to a corresponding given marking conductor, a switch having access to said party line and to said ringing conductors, means for selectively operating said switch to select said party line and to select any one of said ringing conductors, means for completing a connection between said party line and said selected one ringing conductor so that the corresponding one ringing signal is projected over said party line, a line circuit associated with said party line and including a ring relay normally connected to said party line and selectively controlled by said one ringing signal projected over said party line, means controlled jointly by said ring relay and by the simultaneous application of said marking potential to the particular one of said marking conductors corresponding to said one ringing signal for testing with respect to said party line the presence or absence of the particular one of said stations also corresponding to said one ringing signal, means responsive to testing of the presence of said one station on said party line for disconnecting said ring relay from said party line, said switch including a cut off relay operative to interrupt said connection between said party line and said selected one ringing conductor, first means responsive to testing of the absence of said one station from said party line for operating said cut off relay, and second means responsive to answering on said party line for operating said cut off relay.

6. A telephone system comprising a party line adapted to serve a given maximum number of stations, a plurality of stations fewer in number than said given number operatively connected to said party line, a plurality of ringing conductors and a plurality of marking conductors each respectively corresponding to said given number of stations, a generator for applying in timed sequence in repeated cycles a corresponding plurality of ringing signals to said ringing conductors and a marking potential to said marking conductors, whereby a given ringing signal is applied to a corresponding given ringing conductor simultaneously with the application of said marking potential to a corresponding given marking conductor, a switch having access to said party line and to said ringing conductors, means for selectively operating said switch to select said party line and to select any one of said ringing conductors, means for testing the busy or idle condition of said party line, means responsive to testing of said party line as busy for returning a busy-tone signal over said switch, means responsive to testing of said party line as idle for completing a connection between said party line and said selected one ringing conductor so that the corresponding one ringing signal is projected over said party line, a line circuit associated with said party line and including a ring relay selectively controlled by said one ringing signal projected over said party line, means controlled jointly by said ring relay and by the simultaneous application of said marking potential to the particular one of said marking conductors corresponding to said one ringing signal for testing with respect to said party line the presence or absence of the particular one of said stations also corresponding to said one ringing signal, said switch including a cut off relay operative to interrupt said connection between said party line and said selected one ringing conductor, first means responsive to testing of the absence of said one station from said party line for operating said cut off relay, and second means responsive to answering on said party line for operating said cut off relay.

7. A telephone system comprising a party line adapted to serve a given maximum number of stations, said party line including first and second normally disconnected sections, an adapter circuit arranged between said sections and including a ring relay normally connected to said first section, a plurality of stations fewer in number than said given number operatively connected to said second section, a plurality of ringing conductors respectively corresponding to said given number of stations, a generator for applying in timed sequence in repeated cycles a corresponding plurality of ringing signals to said ringing conductors, a switch having access to said first section and to said ringing conductors, means for selectively operating said switch to select said first section and to select any one of said ringing conductors, means for completing a connection between said first section and said selected one ringing conductor so that the corresponding one ringing signal is projected over said first section to control said ring relay, means controlled jointly by said ring relay and by said generator for testing with respect to said second section the presence or absence of the particular one of said stations corresponding to said one ringing signal, means responsive to testing of the presence of said one station on said second section for disconnecting said ring relay from said first section and for connecting said first section to said second section, said switch including a cut off relay operative to interrupt said connection between said first section and said selected one ringing conductor, first means responsive to testing of the absence of said one station from said second section for operating said cut off relay, and second means responsive to answering on said second section for operating said cut off relay.

8. A telephone system comprising a party line adapted to serve a given maximum number of stations, said party line including first and second normally disconnected sections, an adapter circuit arranged between said sections and including a ring relay normally connected to said first section, a plurality of stations fewer in number than said given number operatively connected to said second section, a plurality of ringing conductors respectively corresponding to said given number of stations, a generator for applying in timed sequence in repeated cycles a corresponding plurality of ringing signals to said ringing conductors, a switch having access to said first section and to said ringing conductors, means for selectively operating said switch to select said first section and to select any one of said ringing conductors, means for completing a connection between said first section and said selected one ringing conductor so that the corresponding one ringing signal is projected over said first section to control said ring relay, said one ringing signal corresponding to one of said stations that is either present or absent with respect to said second section, said adapter circuit also including a test relay and a switch relay, means controlled jointly by said ring relay and by said generator for operating said test relay in the event said one station is absent from said second section and for operating said switch relay in the event said one station is present on said second section, means responsive to operation of said switch relay for disconnecting said ring relay from said first section and for connecting said first section to said second section, said switch including a cut off relay operative to interrupt said connection between said first section and said selected one ringing conductor, means responsive to operation of said test relay for operating said cut off relay, and additional means responsive to answering on said second section for operating said cut off relay.

9. A telephone system comprising a party line adapted to serve a given maximum number of stations, a plurality of stations fewer in number than said given number operatively connected to said party line, a plurality of ringing conductors respectively corresponding to said given number of stations, a plurality of marking conductors respectively corresponding to said given number of stations, a generator for applying in timed sequence in repeated cycles a corresponding plurality of ringing signals to said ringing conductors and a marking potential to said marking conductors, whereby a given ringing signal is applied to a corresponding given ringing conductor simultaneously with the application of said marking potential to a corresponding given marking conductor, a switch having access to said party line and to said ringing conductors, means for selectively operating said switch to select said party line and to select any one of said ringing conductors, means for completing a connection between said party line and said selected one ringing conductor so that the corresponding one ringing signal is projected over said party line, a line circuit associated with said party line and including a ring relay selectively controlled by said one ringing signal projected over said party line, strapping means connecting to said line circuit each of said marking conductors corresponding to each of said stations absent from said party line, said line circuit also including a test relay, means governed jointly by the control of said ring relay and the simultaneous application of said marking potential to one of said marking conductors connected to said line circuit for controlling said test relay, said switch including a cut off relay operative to interrupt siad connection between said party line and said selected one ringing conductor, first means responsive to the control of said test relay for operating said cut off relay, and second means responsive to answering on said party line for operating said cut off relay.

References Cited in the file of this patent

UNITED STATES PATENTS

| | | |
|---|---|---|
| 2,300,186 | Wallace | Oct. 27, 1942 |
| 2,508,644 | Jones | May 23, 1950 |